(12) United States Patent
Sattler et al.

(10) Patent No.: US 7,660,900 B2
(45) Date of Patent: Feb. 9, 2010

(54) SYSTEM AND METHOD FOR CONNECTING CLIENT TO HOST

(75) Inventors: Juergen Sattler, Wiesloch (DE); Karsten Fanghaenel, Schwetzingen (DE); Hans-Juergen Richstein, Rauenberg (DE)

(73) Assignee: SAP AG, Waldorf (DE)

( * ) Notice: Subject to any disclaimer, the term of this patent is extended or adjusted under 35 U.S.C. 154(b) by 0 days.

(21) Appl. No.: 11/644,112

(22) Filed: Dec. 21, 2006

(65) Prior Publication Data

US 2008/0155105 A1    Jun. 26, 2008

(51) Int. Cl.
*G06F 15/16* (2006.01)
(52) U.S. Cl. .................... 709/227; 709/228; 709/203
(58) Field of Classification Search .......... 709/203, 709/227–228, 217–219
See application file for complete search history.

(56) References Cited

U.S. PATENT DOCUMENTS 7,136,651 B2 * 11/2006 Kalavade ............... 455/445
2003/0041125 A1 * 2/2003 Salomon ................ 709/203
2003/0120502 A1 * 6/2003 Robb et al. ............... 705/1
2003/0140131 A1 * 7/2003 Chandrashekhar et al. .. 709/223
2005/0289072 A1 * 12/2005 Sabharwal ............... 705/59
2006/0059096 A1 * 3/2006 Dublish et al. ........... 705/57
2006/0168656 A1 * 7/2006 Stirbu .................... 726/15
2006/0171402 A1 * 8/2006 Moore et al. ............ 370/401
2006/0265504 A1 * 11/2006 Taaghol et al. .......... 709/227
2007/0143398 A1 * 6/2007 Graham .................. 709/204

* cited by examiner

*Primary Examiner*—Philip B Tran
(74) *Attorney, Agent, or Firm*—Schwegman, Lundberg & Woessner, P.A.

(57) ABSTRACT

A system includes a support box containing hardware and software for connecting to a host application sever. The support box has an input for providing local settings. A memory connector is adapted to couple to a separate memory device containing connectivity and licensing information pertaining to a specific customer and enabling access to selected host application functions.

8 Claims, 4 Drawing Sheets

SYSTEM AND METHOD FOR CONNECTING CLIENT TO HOST

BACKGROUND

In hosted application scenarios, a customer may have multiple systems that are coupled via a network to one or more hosts. In such hosted application scenarios, most of the application infrastructure is provided centrally by a host system or hosting partners. Certain processes and functionalities however, can only or may better run locally on the customer site over a local area network (LAN). Setting up such a hosted environment can a time consuming manual process, and usually involves several different physical boxes including multiple computers.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein are implemented in software or a combination of software and human implemented procedures in one embodiment. The software may consist of computer executable instructions stored on computer readable media such as memory or other type of storage devices. The term "computer readable media" is also used to represent any means by which the computer readable instructions may be received by the computer, such as by different forms of wireless transmissions. Further, such functions correspond to modules, which are software, hardware, firmware or any combination thereof. Multiple functions are performed in one or more modules as desired, and the embodiments described are merely examples. The software is executed on a digital signal processor, ASIC, microprocessor, or other type of processor operating on a computer system, such as a personal computer, server or other computer system.

Figure 1:
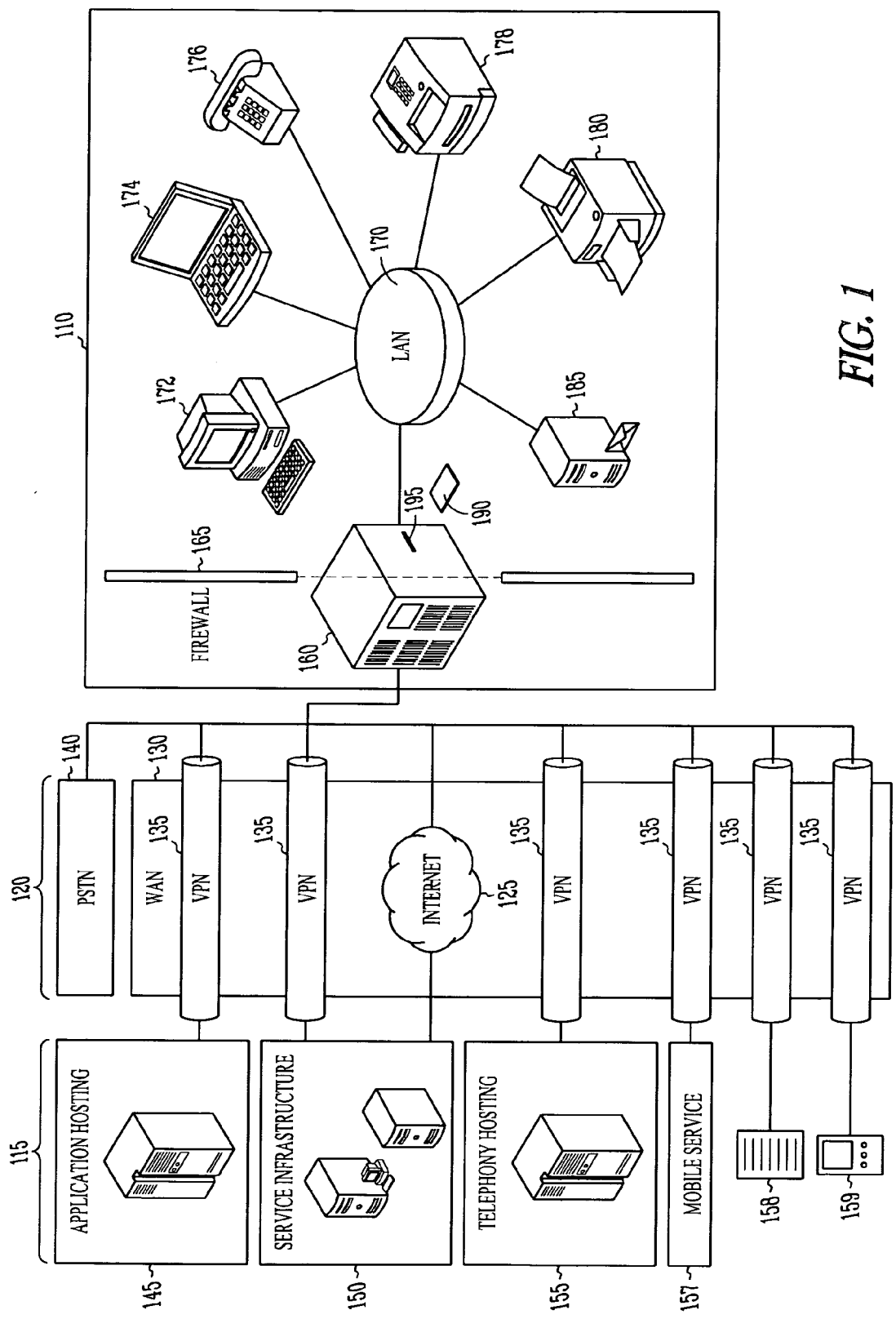
FIG. 1 is a block diagram of a system architecture including a client and host in a hosted application environment according to an example embodiment.

FIG. 1 is a block diagram of a system architecture including a customer environment 110 coupled to a host environment 115 via network 120 in a hosted application environment according to an example embodiment. The network 120 for example, may be a public network such as the Internet 125, a wide area network (WAN) 130 with one or more virtual private networks 135 and may also include a public switched telephone network 140 among others.

The host environment 115 includes one or more servers 145 or other computers that execute one or more applications, such as business software provided by SAP or other application provider. The host environment 115 may also include a service infrastructure 150 that provides software updates, billing and other services not provided by the application servers. Still further, third party services may be provided by yet further servers, such as for example telephony hosting server 155, a mobile services 157 and various appliances such as lap top computer 158 and personal digital assistant 159 for example. The application provider may have special business arrangements that provide for example, discounts for services provided by such third parties, including bulk printing and mailing services or short message services (SMS) for cellular phones for example.

Figure 2:
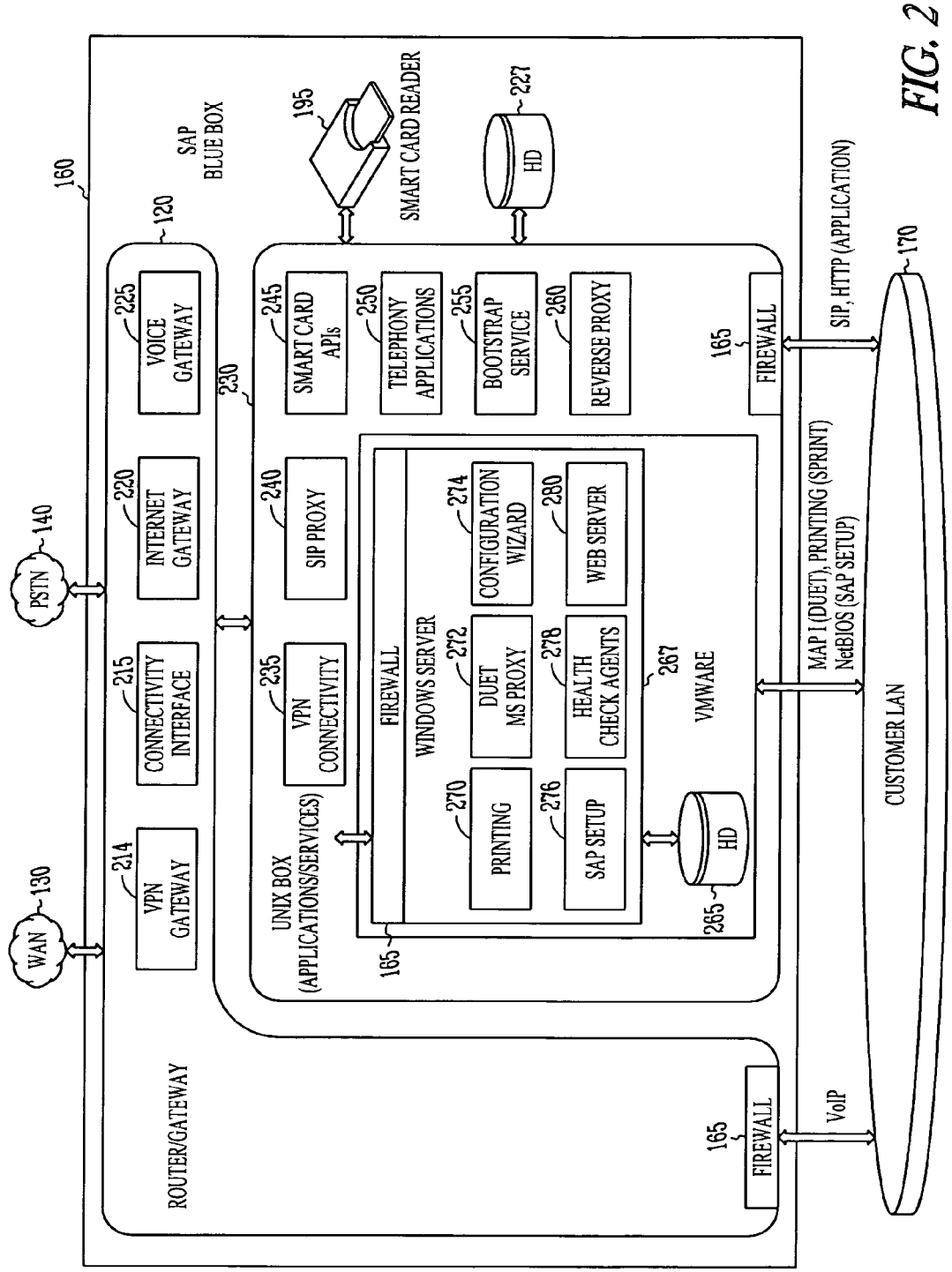
FIG. 2 is a block diagram of a system for connecting a client to a hosted application environment according to an example embodiment.

The network 120 is coupled to the customer environment 110 via a customer central support box 160 in one embodiment. The support box 160 in one embodiment is situated with part of the box outside a customer firewall 165 and part of the box inside of the customer firewall. Further details of firewall division within the access box 160 are shown in FIG. 2. The inside the firewall portion of the support box 160 is coupled to a local area network (LAN) 170 in one embodiment that is coupled to multiple devices within the customer environment 110, such as multiple computers 172, notebook computers 174, telephones 176, fax or multipurpose machines 178, printers 180 and email servers 185.

In one embodiment, a memory device 190 such as a smart card, stores information enabling setup of the customer environment and initialization of the proper services to be provided by the application hosts 115. The memory device 190 may be sent to a customer and inserted into the support box 160 which has one or more memory slots 195. A universal serial bus (USB) memory stick and port may be used in one embodiment.

In one embodiment, the support box 160 automatically establishes all needed connectivity, based on information provided on the smart card. The VPN connections 135 are set-up to the involved parties: the hosting partner 145, service infrastructure landscape 150 and a telephony service partner 155 in one embodiment. The firewall 165 provide protection for internet access which may be used at least for telephony integration, but might as well serve other purposes. For high availability, an additional leased line support through PSTN 140 may be automatically be used as fallback in case internet access is unavailable.

In one embodiment, the support box 160 may be designed to appear monolithic to the customer to underline an all-in-a-box paradigm. Depending on overall functional requirements, it might contain multiple physical computers with different operating systems. It provides numerous connectors to the outside for universal connectivity regarding the shown landscape architecture. A smart card reader 195 may accept the memory card, which may also be referred to as a customer key card containing licensing and connectivity information. The licensing information may be used to identify the amount of services that are to be provided for the customer. The smart card or memory card in essence customizes the support box for each customer in one embodiment.

When the support box 160 is switched on, it first reads a certificate and target addresses from the Smart Card that may be used to establish VPN connections to the service partners. Provided the box is physically connected to a WAN, the connections will be automatically set-up and the support box registered, if the user is eligible to do so.

After the VPN connections are established, the box will instantly start to communicate with the host and check whether this is a first time connectivity. In this case, customer data being stored on the service infrastructure site will be transferred via the support box to the application host. This customer data will contain information about the type and scope of applications that the customer is entitled to use, depending on the licenses he ordered. After successfully providing this information, the host is ready to run the corresponding applications for this customer.

The support box 160 may host several services for the customer including but not limited to a standard SIP router to aid Voice-over-IP (VoIP) telephony integration services, standard printer daemons to provide to print from the remote host. Remote administration of clients may be done via the support box through standard remote access software like WebEX®, NetView®, Netmeeting® etc.).

The remote administration of backend software components on the application server may also be done remotely via the support box. This means basically that there are no direct connections between the service infrastructure and a hosting provider. All service traffic may be routed through the customer site via the support box, enabling a comprehensive auditing of all activities.

Logging and asset management information may also be provided. All settings and setting changes including business configuration and technical configuration may be stored both on the application server and on the support box in one embodiment for redundant storage. An asset management record set with information of all installed components on application backend system may be stored on the box and forwarded to SAP Service Infrastructure.

In one embodiment, software components for groupware integration (MS Exchange connectivity) are provided by the support box. Software components used to set up clients may be available locally on the support box and are accessible via an included web server. Patches and content packages are stored on the support box. Distributable software packages from an application provider installer are kept here as well. In one embodiment, the support box may also serve as a gateway to the application host for service delivery, content delivery, and upgrade/update/patch delivery. In a further embodiment, the support box may provide the necessary connection to Microsoft System Management Server (SMS) to allow for client software distribution such as via Microsoft System Management Server (SMS). Still further, the support box itself may be checked remotely by service provider infrastructure 150 both on a regular basis (e.g. daily) as well as event driven (e.g. when exceeding storage thresholds).

The support box 160 may be thought of in one embodiment as a piece of hardware that ma be delivered to the customer. It contains all necessary hardware and software to connect the customer site to the application host, a service infrastructure site and a telephony host. It ma be mostly preconfigured. In one embodiment, a minimal set of local settings, such as LAN address and Internet IP address, may be provided by the customer. The smart card may be delivered to the customer and when connected to the support box, provides connectivity and licensing information pertaining individually to the customer. Licensing information may control the number of users (named users, total number of users in parallel), activated software components in the application host system and software constraints, such as the number of purchase orders per week.

FIG. 2 is a block diagram of components of the support box 160 for connecting a client to a hosted application environment according to an example embodiment. The numbering is consistent with the numbering of FIG. 1. The support box 160 includes a router/gateway 210 that is coupled to the WAN 130 and may include VPN gateway 214, connectivity interfaces 215, Internet gateway 220 and voice gateway 225 for integrated voice services. In one embodiment, separate hardware components are provided for the VPN gateway and router. Router/gateway is coupled to the customer LAN 170 through firewall 165 for at least voice over IP (VoIP) services. Support box 160 may also include a storage device, such as hard drive 227 for storing data and instructions.

The router/gateway is coupled to an application services block 230, which includes VPN connectivity 235, session initiation protocol (SIP) proxy 240 (to exchange session initiation data between the customer LAN and telephony hosting service), smart card APIs 245, telephony applications 250, bootstrap services 255 and reverse proxy 260 in one embodiment. SIP proxy 240 is used to initiate protocols for plug in devices. Bootstrap services 255 executes commands to initiate connections and configure systems with information from the smart card. Note that this portion of the support box is also on the server side of firewall 165.

Application services 230 also contains VMWare 265 which is accessed through the firewall 165. VMWare 265 contains a windows server 267 on the client side of the firewall 165. Windows server 267 may include a service partner for printing services 270 (allowing the customer to select local printers to expose to the application host), a Duet MS proxy 272 (to feed application events into the MS Exchange infrastructure), configuration wizard 274, setup 276, health check agents 278 (to facilitate remote checking on a timely basis such as once per week as well as locally such as by events) and web server 280 in one embodiment. I further embodiments, windows server 267 may include administration services, router services, LDAP synchronization, and regulatory authority services. A storage device, such as hard drive 284 provides data and program storage services for the windows server 165. The windows server 167 is on the client side of the firewall 165 such that it can work directly with customer components.

Figure 3:
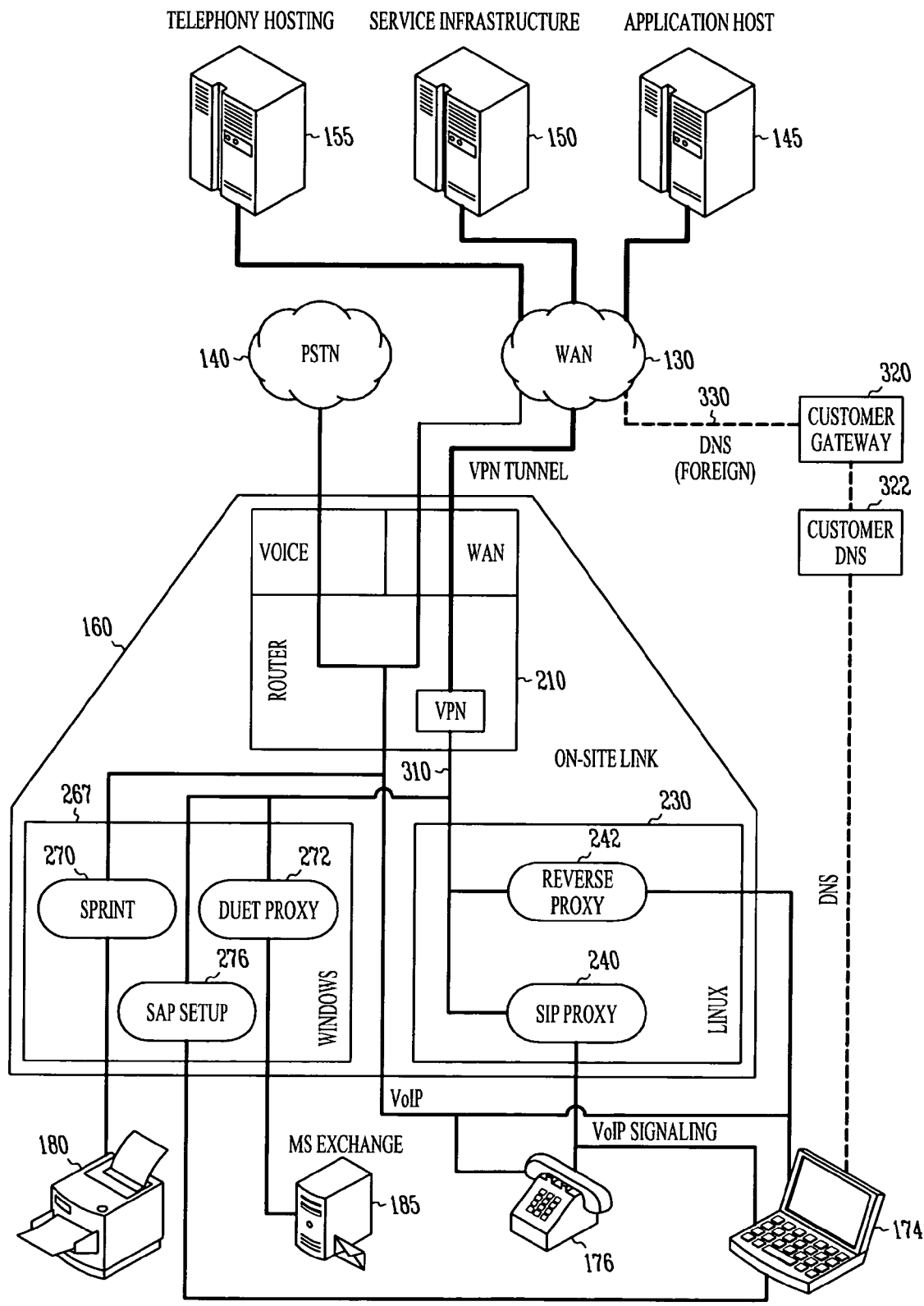
FIG. 3 is a block diagram illustrating dataflow between the client and host in the hosted application environment of FIG. 1.

FIG. 3 is a block diagram illustrating dataflow between the client environment and host in the hosted application environment of FIG. 1. The numbering is consistent with the numbering of FIGS. 1 and 2. In one embodiment, the support box 160 runs a Unix operating system, with a Windows based operating system running on VMWare on top of the Unix operating system. A VPN tunnel 310 provides network bandwidth to both the windows server 167 and the Unix based application server 230. In one embodiment, a default gateway 320 and customer DNS 322 may also be coupled to VPN tunnel 310 and optionally a DNS connection 330 is coupled to the WAN 130.

Figure 4:
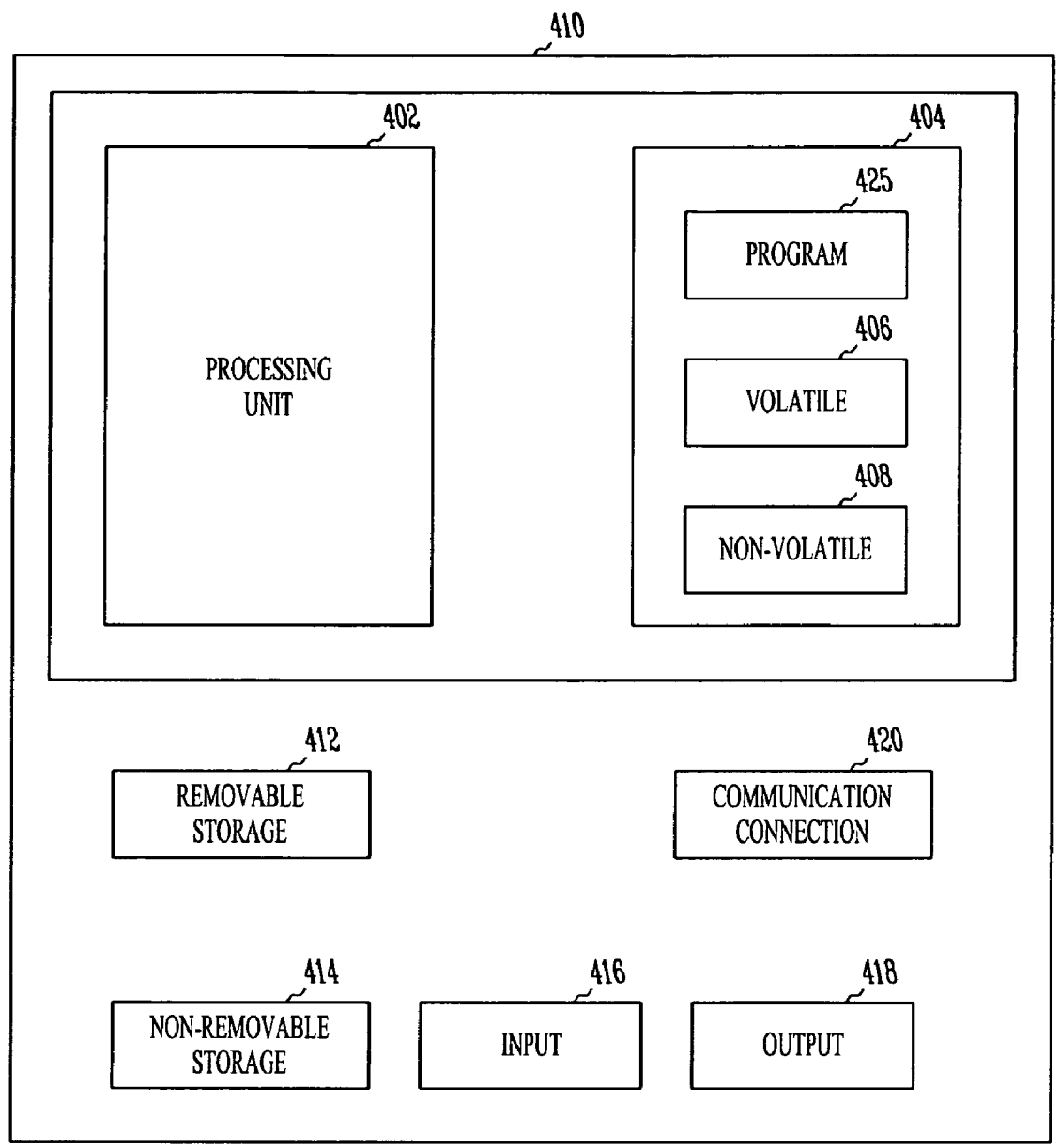
FIG. 4 is a block diagram illustration of a typical computer system for implementing various components of the client and host according to an example embodiment.

A block diagram of a computer system that is capable of serving as a component in a support box or as an application server to execute the above components is shown in FIG. 4. A general computing device in the form of a computer 410, may include a processing unit 402, memory 404, removable storage 412, and non-removable storage 414. Memory 404 may include volatile memory 406 and non-volatile memory 408. Computer 410 may include—or have access to a computing environment that includes—a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 410 may include or have access to a computing environment that includes input 416, output 418, and a communication connection 420. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 402 of the computer 410. A hard drive, CD-ROM, and RAM are some examples of articles including a computer-readable medium.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A method comprising:
    providing a hardware device containing hardware and software for connecting to a remote host application server, the hardware of the hardware device including a memory card reader, a communication initiation protocol proxy, and a bootstrap services component that executes commands to initiate connections and configure system with information read by the memory card reader from a memory card;
    receiving a memory card into the memory card reader, the memory card containing connectivity and licensing information pertaining to a specific customer and enabling the hardware device to access selected application functions on the remote application server in accordance with the licensing information;
    upon switching on the hardware for the first time, reading, via the memory card reader, the connectivity and licensing information from the memory card; and
    establishing virtual private network connections with remote service partners via the communications initiation protocol proxy and based on the connectivity and licensing information read from the memory card and executed at least in part by the bootstrap services component.

2. The method of claim 1 wherein the memory card also contains local settings.

3. The method of claim 2 wherein the local settings are selected from LAN address and Internet IP address.

4. A support box for coupling a customer environment to hosted application environment, the support box comprising:
    a router and gateway for coupling to a wide area network to the hosted application environment and having a firewall between it and a connection to a local area network;
    an application services component coupled to the router and gateway and having a firewall between it and a connection to the local area network, the application services component including:
        a communication initiation protocol proxy: and
        a bootstrap services component that executes commands to initiate connections and configure systems with information from the memory card;
    a server component coupled to the application services component through a firewall and having a direct connection to the local area network; and
    a memory card reader coupled to the application services component for coupling to an external memory card and receiving set up information and licensing information to initiate connections between the customer environment and the hosted application environment, and control access to selected host application functions from a plurality of applications available on the host, said licensing information providing constraints regarding the scope of access to such selected host application functions.

5. The support box of claim 4 wherein the server component includes a web server.

6. The support box of claim 4 wherein the server component includes a local printing services component.

7. The support box of claim 4 wherein the server component includes a configuration wizard.

8. The support box of claim 4 wherein the communication initiation protocol proxy is a session initiation protocol (SIP) proxy.

* * * * *